United States Patent
Knebel

(10) Patent No.: US 6,809,815 B2
(45) Date of Patent: Oct. 26, 2004

(54) OPTICAL ARRANGEMENT FOR SELECTION AND DETECTION OF THE SPECTRAL REGION OF A LIGHT BEAM AND CONFOCAL SCANNING MICROSCOPE

(75) Inventor: Werner Knebel, Kronau (DE)

(73) Assignee: Leica Microsystems Heidelberg GmbH, Mannheim (DE)

( * ) Notice: Subject to any disclaimer, the term of this patent is extended or adjusted under 35 U.S.C. 154(b) by 246 days.

(21) Appl. No.: 09/682,187

(22) Filed: Aug. 2, 2001

(65) Prior Publication Data

US 2002/0021440 A1 Feb. 21, 2002

(30) Foreign Application Priority Data

Aug. 2, 2000 (DE) .......................................... 100 38 049

(51) Int. Cl.[7] ............................... G01J 3/06; G01J 3/28
(52) U.S. Cl. ...................... 356/308; 356/326; 356/328
(58) Field of Search ............................... 356/308, 326, 356/328, 332, 324, 334; 359/368, 385

(56) References Cited

U.S. PATENT DOCUMENTS

| 3,971,921 | A | * | 7/1976 | Schmit et al. ................ 702/73 |
| 5,886,784 | A | * | 3/1999 | Engelhardt .................. 356/326 |
| 6,195,202 | B1 | * | 2/2001 | Kusunose ................... 359/368 |
| 6,462,345 | B1 | * | 10/2002 | Simon et al. ............. 250/458.1 |
| 6,483,103 | B2 | * | 11/2002 | Engelhardt et al. ......... 250/226 |
| 6,555,811 | B1 | * | 4/2003 | Amos ......................... 250/234 |

FOREIGN PATENT DOCUMENTS

DE 199 02 625 A 1 1/1999 ............ G01J/3/42

* cited by examiner

*Primary Examiner*—Alan Mathews
(74) *Attorney, Agent, or Firm*—Houston Eliseeva LLp

(57) ABSTRACT

The present invention concerns an optical arrangement for selection and detection of the spectral region of a light beam (1) in a confocal scanning microscope, having a means (2) for spectral dispersion of the light beam (1), having means (3) for selecting a definable spectral region (4), and having a detection apparatus (5). The optical arrangement should be able to scan or detect multiple narrow-band spectral regions of a spectral region to be detected, in as uninterrupted a fashion as possible and in variably adjustable steps.

26 Claims, 2 Drawing Sheets

OPTICAL ARRANGEMENT FOR SELECTION AND DETECTION OF THE SPECTRAL REGION OF A LIGHT BEAM AND CONFOCAL SCANNING MICROSCOPE

CROSS REFERENCE TO RELATED APPLICATIONS

This application claims priority of a German patent application DE 100 38 049.2, filed Aug. 2, 2000, which is incorporated by reference herein.

BACKGROUND OF INVENTION

The present invention concerns an optical arrangement for selection and detection of the light of a spectral region of a light beam. Furthermore the invention concerns a confocal scanning microscope for selection and detection of the light of a spectral region.

Arrangements of the generic type are known from U.S. Pat. No. 5,886,784 and DE-A-199 02 625. These arrangements are preferably inserted in the beam path of confocal laser scanning microscopes. In this context, a light beam passing through the detection pinhole is spectrally spread with a means for spectral dispersion. A portion of the spectrally spread light beam can then pass through a first variably arranged mirror diaphragm arrangement. The corresponding spectral region is then detected by a detector. The component of the spread light beam that strikes the first mirror diaphragm arrangement is reflected thereat to a further mirror diaphragm arrangement. A portion of the spectrally spread light beam reflected at the first mirror diaphragm arrangement can also pass through the further mirror diaphragm arrangement, and is detected with a further detector. The remaining portion is reflected by the further mirror diaphragm device to a third detector, arranged before which is, optionally, a further mirror diaphragm arrangement.

The known optical arrangements use multiple detection channels for the detection of different spectral regions. Each detection channel is usually equipped with its own detector; this in some cases entails considerable cost. In addition, it is possible with the known optical arrangements to detect multiple spectral regions simultaneously, but detection of numerous narrow-band spectral regions simultaneously is not readily possible with the known arrangements. In particular when the entire spectral region from, for example, 500 nm to 800 nm is to be detected in 5 nm steps, a mechanical displacement of the variably arranged mirror diaphragms is necessary, requiring a relatively large amount of time.

SUMMARY OF INVENTION

It is therefore an object of the present invention to describe and further develop an optical arrangement that can scan or detect, with as few gaps as possible and in variably adjustable steps, multiple narrow-band spectral regions of a spectral region. Rapid and variable spectral detection, which at the same time can be achieved economically, should also be possible.

The above object is accomplished by an optical arrangement which comprises: means for spectral dispersion of the light beam thereby defining a spectrally dispersed light beam, means for selecting a definable spectral region, and a detection apparatus, wherein the means for spectral dispersion of the light beam and the detection apparatus change their position relative to one another.

It is a further object of the present invention to describe a confocal scanning microscope that can scan or detect, with as few gaps as possible and in variably adjustable steps, multiple narrow-band spectral regions of a spectral region. Rapid and variable spectral detection, which at the same time can be achieved economically, should also be possible.

The above object is achieved by a confocal scanning microscope comprising: a laser light source generating a light beam, which defines a illumination beam path, a specimen arranged with respect to a microscope optical system, which defines together with the light from the specimen a detection beam path, means for spectral dispersion of the light beam in the detection beam path, means for selecting a definable spectral region of the light beam, and a detection apparatus, wherein in order to influence the spectral region the spectrally dispersed light beam and the detection apparatus change their position relative to one another.

What has been recognized according to the present invention is firstly that rapid and variable spectral detection can be achieved by means of a relative position change, specifically without mechanically moving at least one mirror diaphragm each time. This relative position change advantageously makes it possible to adjust the spectral detection region much more quickly than is possible with a spectral region change by way of the means for selecting the definable region, thereby reducing the detection time. For example, in particular in the selection of a narrow-band spectral detection region of 5 nm, it is possible on the basis of the relative position change to detect an extended spectral region with this adjusted narrow-band spectral region in steps of 5 nm each.

In a preferred embodiment, the detection apparatus comprises only one detector. This detector could be, for example, a photomultiplier; the use of a photodiode, in particular an avalanche photodiode, would also be conceivable. Because of the relative position change of the spectrally dispersed light beam and the detection apparatus, it is advantageously possible to dispense with the use of multiple detectors; this very considerably reduces manufacturing costs. Ultimately, it is not only two, three, or four detectors that are eliminated, but also their often complex power supplies and readout devices with corresponding peripherals. Also eliminated is the complex physical arrangement of multiple detectors along with their means for selecting the definable spectral region, so that in additionally advantageous fashion, production is considerably simplified.

The relative position change according to the present invention between the spectrally dispersed light beam and the detection apparatus brings about a change in the initial and/or final wavelength of the spectrally selected region. For example, if the spectrally dispersed light beam is shifted laterally relative to the detection apparatus, after that shift the detector then "sees" a spectral region that has a different initial and final wavelength. If the dispersion property of the means for spectral dispersion is smaller, then in this example the width of the spectral region to be detected remains unchanged, since there was no change in the position, relative to the detector, of the means for selecting the definable spectral region. There are several possibilities for carrying out the relative position change between the spectrally dispersed light beam and the detection apparatus.

In a first embodiment, at least one optical component arranged in the beam path is rotated or shifted for the relative position change. The optical component is preferably a mirror. Rotation of a mirror arranged in the optical beam path could tilt the light bundle being detected in the pupil of a lens that collimates the light bundle. The rotating mirror would need to be arranged before the collimating lens in the detection beam path. The rotated or shifted optical component is arranged in the detection beam path before the means for spectral dispersion. Tilting of the light bundle in the pupil of the collimating lens brings about a lateral shift of the spectrally dispersed light beam striking the detection apparatus.

In an alternative embodiment, the relative position change between the spectrally dispersed light beam and the detection apparatus is accomplished by rotating or shifting the means for spectral dispersion. In this way as well, it is possible to shift or change the spectrally dispersed light beam relative to the detection apparatus.

The optical component or the means for spectral dispersion could also be rotated and shifted. This then results depending on the arrangement of the rotation axis and the configuration of the shift in a tilting of the optical component or of the means for spectral dispersion.

Rotation of the means for spectral dispersion and of the aforesaid optical component could be accomplished using a galvanometer. The component to be rotated could be coupled directly to the galvanometer. Preferably it is mounted on the latter's mechanical rotation axis. Alternatively, rotation of the components to be rotated could be accomplished by the use of piezoelements. This rotation could be brought about by way of a mechanical lever, the lever for example extending radially relative to the rotation axis and the piezoelement acting between a stationary housing part and the mechanical lever. A rotation of the component in both opposite rotation directions is necessary in this context, the mechanical lever being coupled to the piezoelement in such a way that the piezoelement can both push and pull the lever.

In a further embodiment, provision is made for the relative position change between the spectrally dispersed light beam and the detection apparatus to be accomplished by means of a relative motion of the detection apparatus. The relative motion of the detection apparatus could be accomplished in this context either in a straight line or on a curve. In general, the means for selecting the definable spectral region (i.e., for example, the slit diaphragm arrangement) are moved along with the detector. In this case the detection apparatus comprises the means for selecting the definable region and the detector. If the relative motion takes place over a distance which is less than the usable extension of the detector, then advantageously only the means for selecting the definable spectral region could be moved.

In particularly advantageous fashion, the relative position change between the spectrally dispersed light beam and the detection apparatus is accomplished by way of a combined angle/position change of at least two optical components. The position change, for example of a rotating mirror, in combination or simultaneously with the relative motion of the detection apparatus, makes possible accelerated detection in the context of a change in the spectral detection setting. It would thus be possible for an optical component arranged in the beam path as well as the means for spectral dispersion and the detection apparatus each to perform, in combined fashion, an angle and/or position change, the frequencies of the respective angle/position changes possibly having a fixed relationship to one another. For example, the second component rotates at twice the frequency of the first component, and the detection apparatus is moved at three times the frequency of the rotary motion of the first component.

A prism, a reflection grating, or a transmission grating is provided as the means for spectral dispersion. The use of a prism for spectral dispersion has the advantage that flare levels with a prism are lower as compared to a grating, so that a prism is preferred for spectral dispersion for the arrangement according to the present invention. A reflection grating or transmission grating would be preferred if flare levels play a subordinate role at the detector, but the means for spectral dispersion (i.e. the grating) is to be rotated or shifted at a higher frequency because of the lower mass.

In a particularly preferred embodiment, the relative position change between the spectrally dispersed light beam and the detection apparatus can be synchronized with the scanning operation of the confocal scanning microscope. This makes it possible to change the spectral detection during the scanning operation as a function of the respective scan position of the confocal scanning microscope, so that in particularly advantageous fashion, for example, for each specimen point the spectral distribution of the fluorescent light emitted from the specimen point can be detected.

In a concrete embodiment, provision is made for a specimen segment to be scanned repeatedly with the confocal scanning microscope, at different spectral detection settings each time, until the entire spectral region to be detected has been detected. Only then is a subsequent specimen segment scanned. A specimen segment could be a point, a line, a straight line, an area, or a three-dimensional region. For example, a line scan could be configured in such a way that the spectral detection region has a width of 5 nm. The total spectral region available for detection extends from 500 nm to 800 nm. The definable spectral detection region is then set, at the beginning of the line scan, in such a way that the detector detects the spectral region from 500 nm to 505 nm. Once the line to be scanned has scanned the specimen a first time, the relative position change of the spectrally dispersed light beam and the detection apparatus is used to set a spectral region of 505 to 510 nm for detection, which is detected by the detector. Provision is made for the same line of the specimen to be scanned repeatedly until the detected light of the defined 5-nm spectral region has been uninterruptedly detected up to the highest wavelength to be detected (800 nm). This procedure is also conceivable in the context of a line of any shape or curvature on a specimen. As regards the area, a rectangle or a two-dimensional region bounded in any fashion is provided for.

Synchronization of the relative position change between the spectrally dispersed light beam and the detection apparatus with the scanning operation of the confocal scanning microscope advantageously also comprises selection of the light wavelength to be coupled into the scanning microscope. In the context of confocal fluorescent scanning microscopy, for example, it is conceivable, during the line scan described above and in accordance with the particular spectral detection region that is set, for light of the corresponding excitation wavelength of the fluorescent dye appropriate for that spectral detection region to be coupled into the scanning microscope. In this context, the light of the corresponding wavelength is coupled in using an acoustooptical component, for example an acoustooptical tunable filter (AOTF) or acoustooptical beam splitter (AOBS). With an AOTF or AOBS it is possible to couple light of a specific wavelength selectively into the confocal scanning microscope, in which context light of several wavelengths can also be coupled in simultaneously, and the light output of the light of the respective wavelength can be controlled using the AOTF or AOBS.

BRIEF DESCRIPTION OF DRAWINGS

In conjunction with the explanation of the preferred exemplary embodiment of the invention with reference to the drawings, an explanation is also given of generally preferred embodiments and developments of the teaching.

In the drawings, FIG. 1 schematically depicts an exemplary embodiment of the optical arrangement according to the present invention.

DETAILED DESCRIPTION

Figure 1:
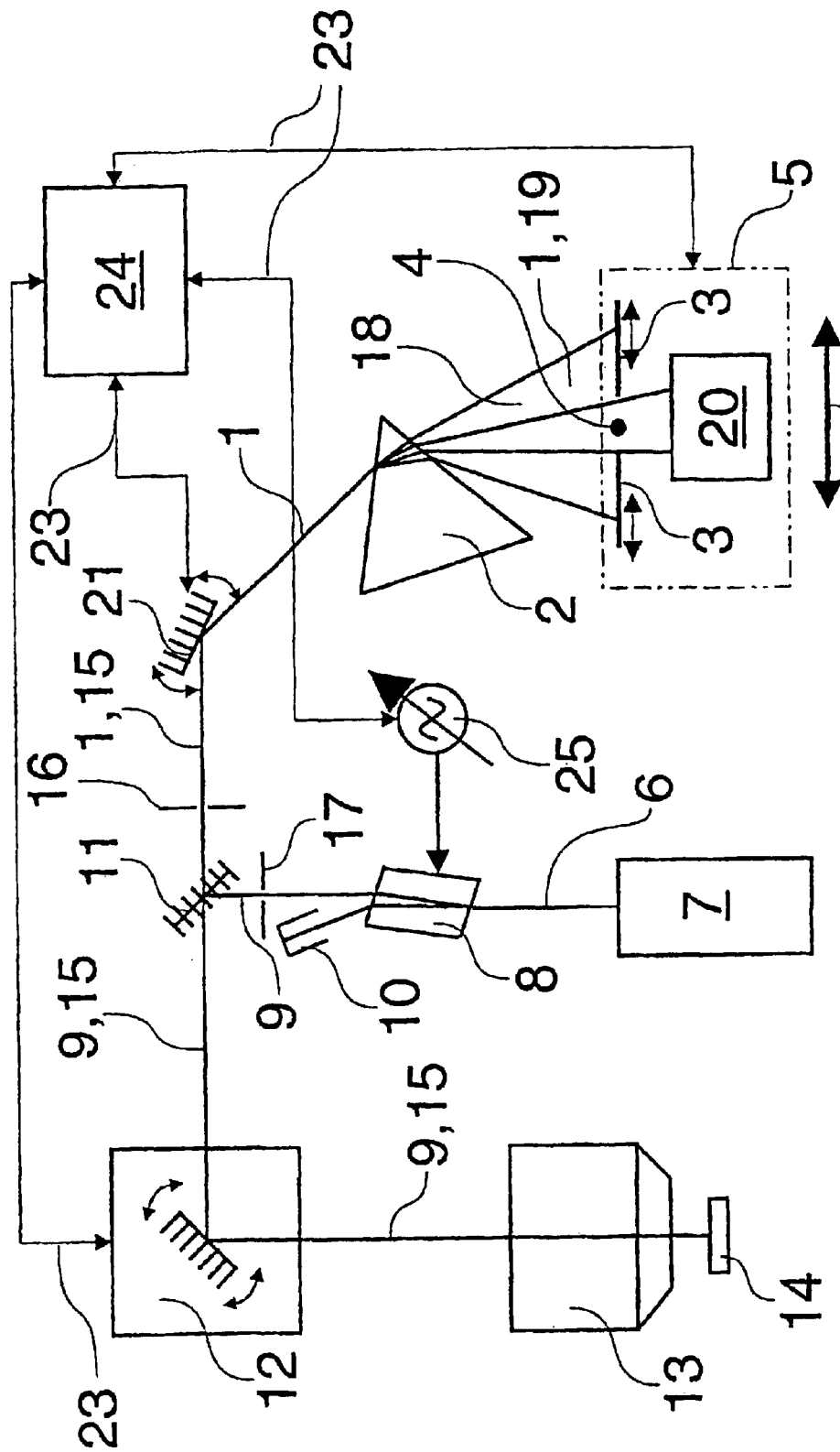

FIG. 1 shows an optical arrangement for selection and detection of the spectral region of a light beam 1 in a confocal scanning microscope, having a means 2 for spectral dispersion of the light beam 1, having means 3 for selecting a definable spectral region 4, and having a detection apparatus 5.

Figure 2:
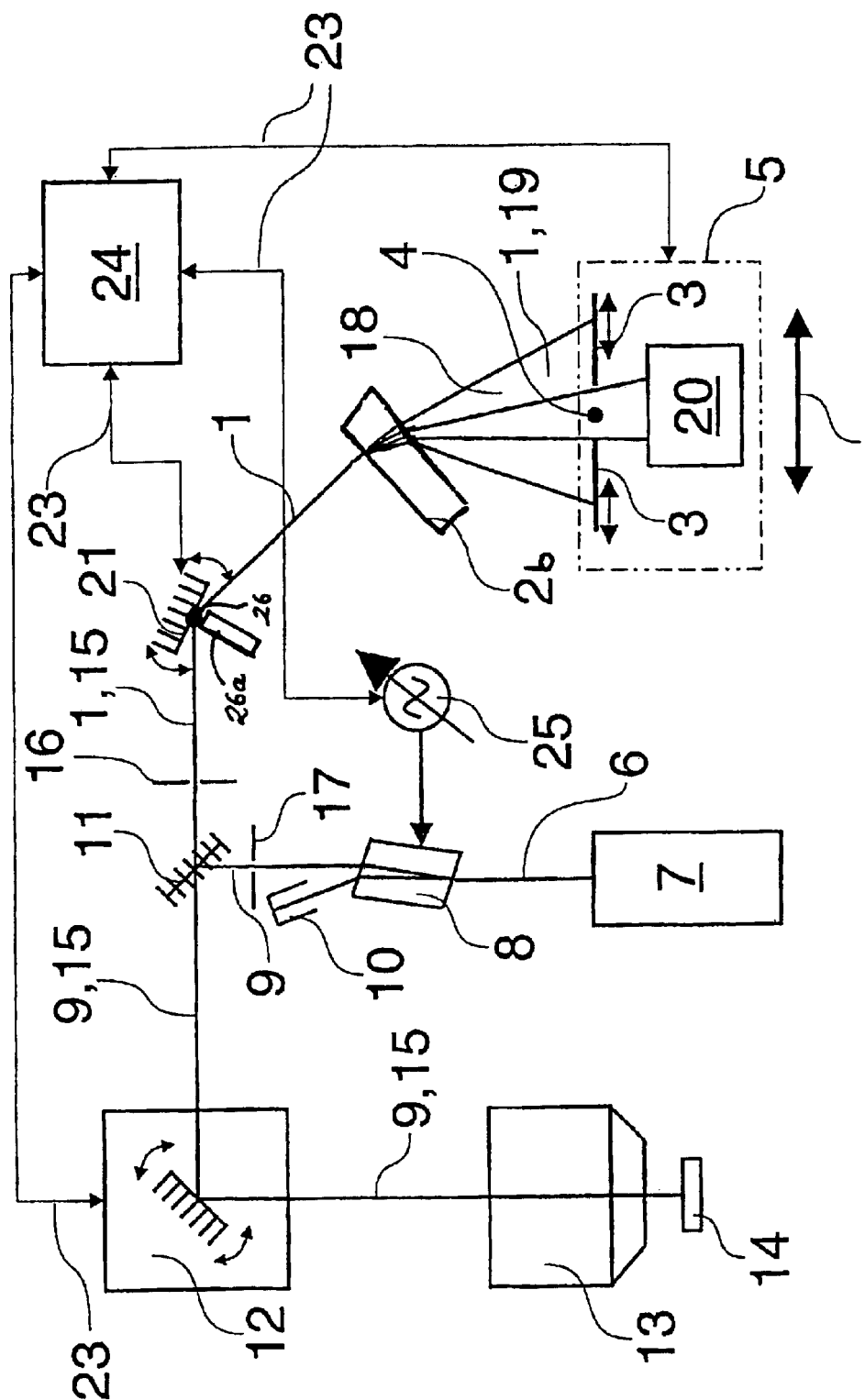
FIG. 2 shows an embodiment of this invention.

FIG. 2 shows an embodiment of this invention.

In the confocal scanning microscope shown in FIG. 1, laser light 6 of laser light source 7 is coupled by means of an AOTF 8 into illumination beam path 9 of the confocal scanning microscope. The laser light that is not coupled in is absorbed by beam trap 10. Coupled-in laser light 9 is reflected at dichroic beam splitter 11 to beam deflection device 12, at which illuminating light 9 is deflected in two directions that are substantially perpendicular to one another. The illuminating light passes through microscope optical system 13 and illuminates the (schematically indicated) fluorescent specimen 14. Fluorescent light 15 emitted from fluorescent specimen 14 passes along the beam path in the opposite direction to dichroic beam splitter 11.

After passing through detection pinhole 16, which is arranged in a focal plane corresponding to the plane of excitation pinhole 17, fluorescent light 15 or 1 is further processed by the optical arrangement according to the present invention for further detection. According to the present invention, in order to influence spectral region 4, 18 that is to be detected, spectrally dispersed light beam 19 and detection apparatus 5 can be changed in their position relative to one another. Detection apparatus 5 comprises a single detector 20.

The relative position change between spectrally dispersed light beam 19 and detection apparatus 5 brings about a change in the initial and/or final wavelength of spectrally selected region 4. The relative position change is accomplished by rotation of mirror 21 arranged in detection beam path 15. Mirror 21 is arranged before means 2 for spectral dispersion. The rotation of mirror 21 takes place about rotation axis 26 running perpendicular to the drawing plane.

A relative motion of detection apparatus 5 is additionally provided for the relative position change between spectrally dispersed light beam 19 and detection apparatus 5. Detection apparatus 5 is moved in a straight line along direction 22. Detector 5 and means 3 for selecting definable region 4 are thus shifted together.

In this exemplary embodiment, therefore, two optical components mirror 21 and detection apparatus 5 are subjected to a combined angle and position change. In this context, the motion of detection apparatus 5 is performed slowly compared to the rotary motion of mirror 21.

A prism 2 provides spectral dispersion of light beam 15.

By means of connections 23, the relative position change between spectrally dispersed light beam 19 and detection apparatus 5 can be synchronized with the scanning operation of the confocal scanning microscope. The present position of beam deflection device 12 is transferred via synchronization connection 23 to control computer 24 of the confocal scanning microscope, which moves mirror 21 and detection apparatus 5 as a function of the present beam position of beam deflection apparatus 12. Control computer 24 of the confocal scanning microscope is also connected via a connection 23 to control apparatus 25 of AOTF 8, so that selection of the light wavelength to be coupled into the scanning microscope can also be performed synchronously with the relative position change between spectrally dispersed light beam 19 and detection apparatus 5.

In conclusion, be it noted very particularly that the exemplary embodiment discussed above serves merely to describe the teaching claimed, but does not limit it to the exemplary embodiments.

FIG. 2 shows an embodiment of this invention comprising a reflection grating or transmission grating 2b. In this embodiment, the rotation of the mirror 21 takes place around the rotation axis 26 running perpendicular to the drawing plane. In this embodiment, the rotation is accomplished using the galvanometer or piezoelement 26a.

What is claimed is:

1. An optical arrangement for selection and detection of a spectral region of a light beam comprising:
   means for spectral dispersion of the light beam defining the spectrally dispersed light beam in a detection beam path;
   means for selecting a definable spectral region of the spectrally dispersed light beam; end
   a moveable single detection apparatus disposed in the detection beam path; and
   a moveable optical component arranged in the light beam, wherein the optical component and the single detection apparatus are arranged to change a position relative to one another.

2. The arrangement as defined in claim 1, wherein the moveable optical component is a mirror rotatable about a rotation axis.

3. The arrangement as defined in claim 1, wherein the change of the position between the moveable optical component and the single detection apparatus relative to one another is accomplished by a rotation of the optical component and a shift of the single detection apparatus.

4. The arrangement as defined in claim 1, wherein the means for spectral dispersion comprises essentially a prism, a reflection grating or and a transmission grating.

5. The arrangement as defined in claim 1, wherein the optical component is arranged before the means for spectral dispersion.

6. The arrangement as defined in claim 1, wherein the change of a position between the optical component and the detection apparatus relative to one another is accomplished by a rotation of the optical component.

7. The arrangement as defined in claim 1, wherein the change of the position between the optical component and the detection apparatus relative to one another is accomplished by a shift of the detection apparatus.

8. The arrangement as defined in claim 7, wherein the shift of the single detection apparatus proceeds along a straight line or a curve.

9. A confocal scanning microscope comprising:
   a laser light source generating a light beam defining an illumination beam path;
   a detection beam path defined by the light beam propagating from a specimen arranged with respect to a microscope optical system;
   means for spectral dispersion of the light beam in the detection beam path,
   means for selecting a definable spectral region of the light beam, a moveable single detection apparatus in the detection beam path; and a moveable optical component arranged in the detection beam path, wherein the optical component and the single detection apparatus are arranged to change their position relative to one another in order to influence the detected spectral region of the light in a spectrally dispersed portion of the light in the detection beam path.

10. The confocal scanning microscope as defined in claim 9, wherein the moveable optical component arranged in the detection beam path is a mirror, which is rotatable about a rotation axis.

11. The confocal scanning microscope as defined in claim 10, wherein the mirror is arranged before the means for spectral dispersion.

12. An confocal scanning microscope comprising:

a laser light source generating a light beam, which defines an illumination beam path;

a detection beam path;

means for spectral dispersion of the light beam in the detection beam path, means for selecting a definable spectral region of the light beam in the detection beam path;

a moveable single detection apparatus; and an optical component arranged in the detection beam path, wherein in order to select the definable spectral region, the optical component and the detection apparatus change their position relative to one another.

13. The confocal scanning microscope as defined in claim 12, wherein the optical component is a mirror, wherein the mirror is rotatable about a rotation axis.

14. The confocal scanning microscope as defined in claim 12, wherein the change of the position between the optical component and the detection apparatus relative to one another is accomplished by a rotation of the optical component and a shifting of the detection apparatus.

15. The confocal scanning microscope as defined in claim 12, wherein the change in relative position of the detection apparatus proceeds along a straight line or a curve.

16. The confocal scanning microscope as defined in claim 12, wherein the means for spectral dispersion consists essentially of a prism, a reflection grating, or a transmission grating.

17. The confocal scanning microscope as defined in claim 12, wherein the relative position change between the optical component and the detection apparatus is synchronized with the scanning operation of the confocal scanning microscope.

18. The confocal scanning microscope as defined in claim 17, wherein a specimen segment is scanned repeatedly with the confocal scanning microscope, at different spectral detection settings each time, until the entire spectral region to be detected has been detected, before a subsequent specimen segment is scanned.

19. The confocal scanning microscope as defined in claim 18, wherein the specimen segment consists essentially of a point, a line, a straight line, an area or a three-dimensional region.

20. The confocal scanning microscope as defined in claim 17, wherein synchronization also comprises selection of a light wavelength to be coupled into the confocal scanning microscope.

21. The confocal scanning microscope as defined in claim 20, wherein selection of the light wavelength to be coupled in is accomplished with an acoustooptical component, for example an acoustooptical tunable filter (AOTF) or acoustooptical beam splitter (AOBS).

22. The arrangement as defined in claim 12, wherein the optical component is arranged before the means for spectral dispersion.

23. The confocal scanning microscope as defined in claim 12, wherein the change of the position between the optical component and the detection apparatus relative to one another is accomplished by a rotation of the optical component.

24. The confocal scanning microscope as defined in claim 23, wherein a galvanometer is used to accomplished rotation of the optical component.

25. The confocal scanning microscope as defined in claim 24, wherein the optical component to be rotated is coupled directly to the galvanometer and mounted on the latter's mechanical rotation axis.

26. The confocal scanning microscope as defined in claim 23, wherein the rotation is accomplished by the use of piezoelements.

* * * * *